April 9, 1957    J. B. MATHIS    2,787,948
ROTARY SPIT THERMOMETER
Filed Oct. 12, 1955    2 Sheets-Sheet 1
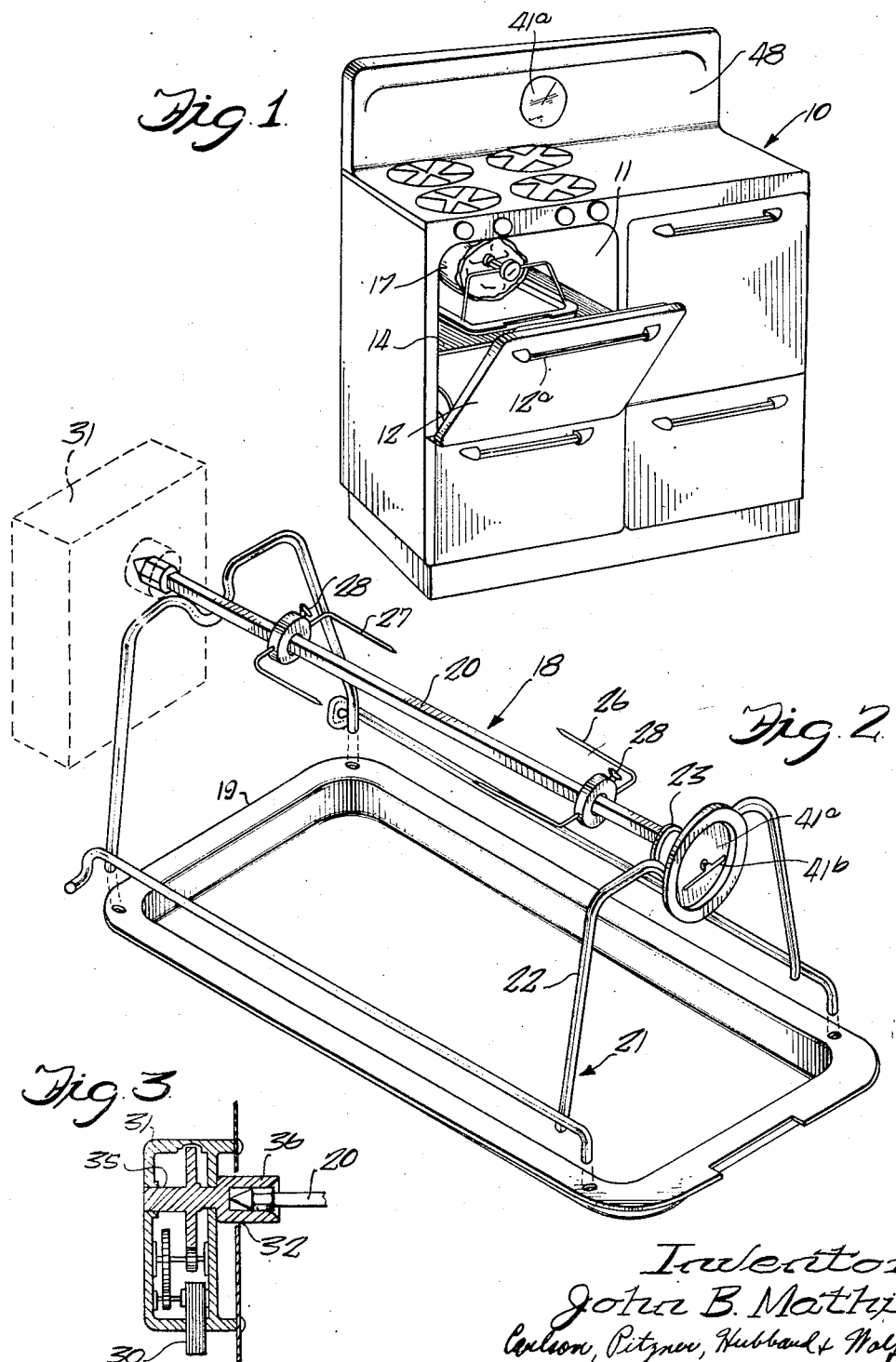

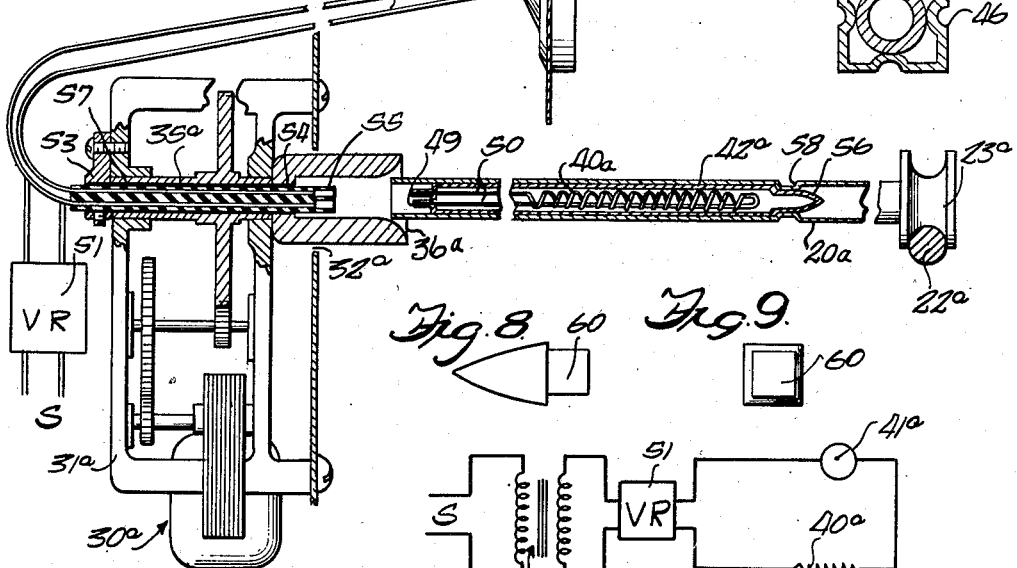

United States Patent Office 2,787,948
Patented Apr. 9, 1957

2,787,948

ROTARY SPIT THERMOMETER

John B. Mathis, Chicago, Ill., assignor to Florence Stove Company, Gardner, Mass., a corporation of Massachusetts Application October 12, 1955, Serial No. 540,050

12 Claims. (Cl. 99—421)

The present invention relates to spit assemblies for holding meat or other articles of food to be cooked in an oven or the like. More particularly, the invention pertains to a temperature sensing device for use with a spit assembly employed for broiling meat or other foodstuffs in a range.

It is a general object of the present invention to provide a novel food holding spit assembly having built-in means for indicating when the food has been cooked to the extent desired. An associated object is to provide such a spit assembly which includes an element responsive to the temperature of the central portion or "heart" of the meat or other foodstuff being cooked, and means for indicating this temperature.

It is a more specific object of the invention to provide a spit assembly having a hollow shaft for insertion through the center of a piece of meat or the like and including a temperature sensitive element arranged in the interior of the shaft. A related object is to provide a hollow spit shaft with a temperature responsive element centered longitudinally within the shaft for accurately sensing the temperature of the "heart" of the meat being cooked. A further allied object is to provide the temperature responsive spit shaft with means for isolating the central food holding portion thereof from the end portions of the shaft to thereby shield the temperature sensing element from ambient oven heat.

Another object of the invention relative to one form of the invention is to provide a food holding spit assembly having a built-in thermometer including an indicator directly mounted on the spit assembly. An ancillary object as regards an alternative form of the invention is to provide such an assembly including a remotely located indicator which may be mounted in any suitable place, such as on the back guard of the range.

It is a further object of the present invention in one of its aspects to provide a spit assembly of the direct indicating type having an indicator mounted on one end of the spit shaft to thereby function also as a spit handle.

Finally, it is an object of the invention to provide a rotary spit assembly including a built-in thermometer, which assembly is simple and economically manufactured and which requires a minimum of care and maintenance.

Other objects and advantages of the invention will become apparent upon reference to the following description, taken in conjunction with the accompanying drawings, in which:

Figure 1 is a perspective of an illustrative range showing the present spit assembly in use in the boiler compartment.

Fig. 2 is a perspective of the spit assembly of Fig. 1 as mounted on a broiler pan.

Fig. 3 is a fragmentary elevation, partly in section, showing the motor drive means employed for rotating the spit assembly when the latter is used in a range.

Fig. 4 is an enlarged view of the spit shaft and built-in thermometer shown in Fig. 2.

Fig. 5 is an enlarged sectional view of the central portion of the shaft shown in Fig. 4.

Fig. 6 is a transverse sectional view taken along the line 6—6 in Fig. 5.

Fig. 7 shows an alternative form of the invention wherein a remote temperature indicator is employed.

Figs. 8 and 9 are side and end views, respectively, of a piercing point which may be inserted over the open end of the spit shaft shown in Fig. 7 when the shaft is inserted through a piece of meat or the like.

Fig. 10 shows the electrical circuit used with the alternative form of the invention shown in Fig. 7.

While the invention has been described in connection with certain preferred embodiments, it will be understood that it is not intended to limit the invention thereto but rather it is intended to cover all alternative constructions and modifications falling within the spirit and scope of the appended claims.

Turning now to the drawings, a rotary spit assembly embodying the invention is illustrated as employed with the oven of a domestic range 10. The range here shown includes a broiler oven 11 which has the usual oven door 12 and a gas oven burner (not shown) located well above a broiler shelf 14. The door 12 may be hinged along its lower edge and provided with a handle 12a to facilitate opening and closing.

Referring particularly to Fig. 2, the rotary spit assembly comprises a unit 18 which is insertable into and removable from the oven 11 when the door 12 is open. For catching drippings and also serving as a base support, the unit 18 includes a broiler pan 19 which may be placed on and supported by the shelf 14. A hollow spit shaft 20 adaptable to be inserted through a foodstuff 17 such as meat or the like (Fig. 1) is rotatably supported above the pan by a harness frame or spit support 21 made of metal rod and adapted to be inserted through openings in the pan as shown. The frame 21 includes at each end thereof a vertically extending cross bracket 22 bent to form a downwardly looping bight at its middle section for cradling and journaling the ends of the spit shaft 20. At its forward end, the spit shaft 20 carries a pulley or journal 23 which has a central groove adapted to receive the bight of the associated cross bracket 22. In this way, the forward end of the spit shaft 20 is cradled and journaled by the harness frame 21. The pulley shaped journal 23 also serves to prevent inadvertent axial movement of the spit shaft 20 relative to the broiler pan 19 since the central groove of the pulley neatly receives the associated cross bracket 22. Thus, the spit shaft may be lifted out of the cradle or frame but when supported therein as shown, it is freely rotatable.

Considering now the details of the spit shaft 20, it will be observed that it is pointed at its rear end to facilitate passage through meat or other foodstuffs to be cooked. It is also formed of hexagonal cross-section at its rear end to facilitate making a driving connection therewith. For preventing rotation of the food relative to the spit shaft 20 and for holding the food in centered position on the shaft, opposed skewers 26, 27 may be slidably mounted on the spit shaft and locked in selected axial positions by set screws 28.

For driving the spit shaft 20 when it is placed in the oven as shown in Fig. 1, an electric gear motor 30 is mounted at the rear of the oven. The motor is contained in a suitable housing 31 which is adapted to be secured in an opening 32 in the rear wall of the oven 11. While the electric driving motor may take a variety of forms, that shown here by way of example is a shaded pole motor connected by suitable reduction gearing to an output shaft 35 extending forwardly into the oven 11 at a point where it may be engaged with the rear end of the spit shaft 20, cooperating socket formations on the shaft and the spit shaft effecting driving engagement between the two upon insertion of the unit 18 into the oven. For this purpose, the forward end of the output shaft 35 carries a rigidly attached or integral flared socket 36 which is hexagonal in cross-section to receive the rear end of the spit shaft 20.

In accordance with the present invention, thermometer means for determining when the foodstuff 17 is cooked to the extent desired is provided in the form of a temperature sensing element 40 inserted into the hollow interior of the spit shaft 20 to there respond to the temperature of the food, and a temperature indicator 41 connected to the sensing element 40. In this instance, it will be seen from Fig. 4 that the temperature sensing element 40 comprises a helically wound bi-metal which may be housed in a protecting tube 42 to form a probe which may then be inserted longitudinally into the interior of the hollow shaft 20. The inner end of the bi-metal is anchored within the tube 42 at 44 and the outer end of the bi-metal extends through the tube to the temperature indicator 41 which is shown integrally formed with the tube. As here shown, the indicator is directly connected to the bi-metal 40 so that the warpage of the bi-metal due to temperature changes may be physically transmitted thereto. As will be evident, such direct mounting of the indicator on the spit shaft 20 enables the indicator to also serve as a spit handle. Although the indicator 41 which is illustrated has a central movable thermometer dial 41a and a stationary pointer 41b, the indicator employed may be of any suitable type, as for example, the type wherein the indicating pointer is movable and the thermometer dial is stationary.

Turning now to Fig. 5, means are provided for shielding the temperature sensing element 40 from the effects of ambient oven heat which would normally be conducted from the exposed spit shaft 20 along the shaft to the central portion thereof. Such means comprises a pair of isolators 45 formed of Bakelite or hard rubber or any other suitable non-conductor of heat, which are integrally formed with the spit shaft 20 and axially spaced apart along the shaft to define the central portion thereof containing the temperature sensing element 40. Each of the isolators 45 comprises a shouldered ring having an inner sleeve portion 45a adapted to fit snugly within the inner periphery of the spit shaft 20 and to receive the protecting tube 42, and a raised central portion 45b which is flush with the outer surface of the spit shaft and forms a part thereof. Attention is drawn to the fact that the isolators 45 serve a dual function in insulating the central portion of the spit shaft 20 from the end portions thereof, and also in defining the central meat holding portion of the spit shaft 20. This latter feature enables a housewife to quickly place a piece of meat to be cooked in the proper centered position upon the spit shaft 20.

For effecting heat conducting contact between the sensing element containing tube 42 and the adjacent portion of the spit shaft 20, the central portion of the shaft between the isolators 45 is fluted inwardly as shown at 46 in Figs. 5 and 6. In such an arrangement the metal of the central portion of the spit shaft is pressed into intimate contact with the metal of the tube 42 so that heat is quickly conducted from the meat held on the shaft through the walls of the shaft and tube and to the temperature sensing bi-metal 40. This arrangement is particularly advantageous since there results an accurate measurement of the temperature of the "heart" of the meat, and further there is a very short time delay in response by the element 40 to changes in the meat temperature. As shown in Fig. 5, the inner end of the protecting tube 42 which is removed from the temperature sensing area is jacketed and insulated from the external heat of the meat or oven by an air blanket which fills the annular space 47 formed between the inner end of the spit shaft 20 and the tube.

One of the features of the invention is that the temperature sensing element 40 is shielded from the ambient oven heat except at the mid-portion of the spit shaft 20 where a direct heat conducting path is maintained between the sensing element and the center of the meat being cooked. In this way, the spit assembly 18 is utilized to novelly indicate the degree of "doneness" of the meat being cooked.

Turning now to Fig. 7, a second embodiment of the invention is there shown. In this instance the invention features an indicator 41a which is remotely located with respect to the spit shaft carried temperature sensing element 40a, being mounted on the back guard 48 (Fig. 1) of the range, for example. The temperature sensing element 40a employed in this form of the invention is of the electrical resistance type and suitable electrical connections are made through the driving means for the rotary spit assembly, as will be further described.

As shown, a spit shaft 20a is provided which is similar to that shown in Figs. 4 and 5 except that the indicator 41a is not mounted directly thereon and the rear end of the shaft 20a terminates in a male plug 49 containing electrical leads to the temperature sensing element 40a. The spit shaft 20a is rotatably held on a spit support having cross brackets 22a, the forward end of the shaft carrying a journal 23a.

In this embodiment the temperature sensing element 40a comprises a coiled resistance wire housed in a protecting tube 42a and having a pair of electrical leads 50 terminating in the plug 49. Of course, it will be understood that the temperature sensing element may be of any conventional electrical type as, for example, the type wherein the element is formed of a material having a negative rather than a positive temperature coefficient of resistance. The indicator 41a employed in this instance is a milliammeter type instrument capable of indicating changes in electric current flow.

As illustrated in Fig. 10, a series electrical circuit is thus formed including the temperature sensitive element 40a and the indicator 41a, with a voltage regulator 51 of standard construction being connected across a suitable voltage source S. A step down transformer T is usually required to reduce the voltage applied to the circuit. The regulator 51 maintains constant voltage in the circuit so that changes in current flow due to variations in the electric resistance of the wire 40a resulting from temperature changes in the meat are communicated to the indicator 41a through the lead wires 52. If desired a switch may be included in the circuit for closing a solenoid valve in the gas burner feed line upon the attainment of a predetermined minimum or maximum current flow. Such an arrangement would automatically shut off the oven burner when the meat or other foodstuff is cooked.

As shown in Fig. 7, the driving arrangement for rotating the spit assembly is substantially identical with that shown in Figs. 2 and 3. The drive includes a gear motor 30a mounted in a housing 31a affixed to an opening 32a in the range frame, the motor having an output shaft 35a. In this instance, the output shaft 35a is hollow and houses therein a cylindrical wire conduit piece 54, which carries the lead wires 52 from the indicator 41a for connection with the temperature sensing element 40a. The conduit 54 is dimensioned to fit loosely within the shaft 35a so that it may be held from rotating with the shaft by a clip 53 and screw 57 secured to the back of the housing 31a. Slip motion between the rotary spit shaft and the stationary conduit 54 is thus effected at the electrical plug and socket 49, 55. It will be seen that the conduit 54 is formed at its forward end in the shape of a female electrical socket 55 which terminates within a flared socket 36a formed on the end of the output shaft 35a for drivingly engaging the rear end of the spit shaft 20a. Thus the electrical circuit is closed when the spit shaft 20a is drivingly coupled with the motor output shaft 35a and the electrical plug and socket 49, 55, are engaged.

Once again, the protecting tube 42a is dimensioned to fit snugly within the spit shaft 20a, the tube in this instance being provided at its inner end with a pointed projection 56 adaptable for engaging a portion 58 of the shaft having a restricted diameter, to thereby seat the tube within the shaft. The intimate wall-to-wall contact between the tube and shaft thus facilitates efficient conduction of heat from the meat being cooked to the temperature responsive element 40a. Although not shown in Fig. 7, it will be understood that isolators (45 in Fig. 5) may also be employed in this form of the invention, if desired. Likewise the spit shaft 20a may be fluted as at 46 (Fig. 5) if this arrangement is preferred.

In order that the rear end of the spit shaft 20a carrying the electric plug 49 may be inserted through a piece of meat or other foodstuff to be cooked, a removable piercing point 60 is provided as shown in Figs. 8 and 9. The piercing point 60 is sized to neatly fit over the plug 49 so that after the spit shaft 20a has been inserted through the meat, the point may be removed from the shaft and the plug may be engaged with the socket 55.

I claim as my invention:

1. A rotary spit assembly for use in broiling a foodstuff in an oven comprising, in combination, a drip pan removably insertable into the oven, vertical support brackets on said pan, an elongated hollow spit shaft for insertion through the foodstuff and removably journaled in said brackets, means for rotating said spit shaft, a probe including a temperature sensing element inserted in said shaft, and means for indicating the temperature of said element for determining when the foodstuff is cooked.

2. A rotary spit assembly for use in broiling a foodstuff comprising, in combination, an elongated hollow spit shaft for insertion into the foodstuff, means for rotatably supporting said spit shaft, a temperature sensing element inserted in said shaft, and means for indicating the temperature of said element for determining when the foodstuff is cooked.

3. A rotary spit assembly for use in broiling a foodstuff comprising, in combination, a hollow spit shaft for insertion into the foodstuff, means for supporting said spit shaft, a temperature sensing element inserted in said shaft, and means for indicating the temperature of said element for determining when the foodstuff is cooked.

4. A rotary spit assembly for use in broiling a foodstuff in an oven comprising, in combination, an elongated hollow spit shaft for insertion into the foodstuff, means for rotatably supporting said spit shaft, means for rotating the shaft, a temperature sensing element inserted in said shaft, and means for indicating the temperature of said element for determining when the foodstuff is cooked.

5. A rotary spit assembly for use in broiling a foodstuff comprising, in combination, an elongated hollow spit shaft for insertion through the foodstuff, means for rotatably supporting said spit shaft, a temperature sensing element inserted in the central longitudinal portion of said shaft, and means for indicating the temperature of said element for determining when the foodstuff is cooked.

6. A rotary spit assembly for use in broiling a foodstuff comprising, in combination, an elongated hollow spit shaft for insertion through the foodstuff, means for rotatably supporting said spit shaft, a pair of isolators axially spaced along said spit shaft for defining therebetween the central longitudinal portion of the shaft and for insulating this portion from the shaft ends, a temperature sensing element inserted in the central longitudinal portion of said shaft, and means for indicating the temperature of said element for determining when the foodstuff is cooked.

7. A rotary spit assembly for use in broiling a foodstuff comprising, in combination, an elongated hollow spit shaft for insertion through the foodstuff, means for rotatably supporting said spit shaft, a pair of isolators axially spaced along said spit shaft for defining therebetween the central longitudinal portion of the shaft and for insulating this portion from the shaft ends, a temperature sensing element inserted in the central longitudinal portion of said shaft, means for insulating said central shaft portion from the shaft ends, and means for indicating the temperature of said element for determining when the foodstuff is cooked.

8. A rotary spit assembly for use in broiling a foodstuff comprising, in combination, an elongated hollow spit shaft for insertion through the foodstuff, means for rotatably supporting said spit shaft, a pair of isolators axially spaced along said spit shaft for defining therebetween the central longitudinal portion of the shaft and for insulating this portion from the shaft ends, a probe including a temperature sensing element inserted in the central longitudinal portion of said shaft, said central portion of the shaft being fluted inwardly into heat conducting engagement with said probe, means for insulating said central shaft portion from the shaft ends and means for indicating the temperature of said element for determining when the foodstuff is cooked.

9. A rotary spit assembly for use in broiling a foodstuff comprising, in combination, an elongated hollow spit shaft for insertion through the foodstuff, means for rotatably supporting said spit shaft, a pair of isolators axially spaced along said spit shaft for defining therebetween the central longitudinal portion of the shaft and for insulating this portion from the shaft ends, a probe including a temperature sensing element inserted in the central longitudinal portion of said shaft, said central portion of the shaft being fluted inwardly into heat conducting engagement with said probe, means for insulating said central shaft portion from the shaft ends, and means mounted on said shaft forming a handle for the spit assembly for indicating the temperature of said element for determining when the foodstuff is cooked.

10. A rotary spit assembly for use in broiling a foodstuff comprising, in combination, an elongated hollow spit shaft for insertion into the foodstuff, means for rotatably supporting said spit shaft, a temperature sensing element inserted in said shaft, and means located remotely from said temperature sensing element for indicating the temperature of the element for determining when the foodstuff is cooked.

11. A rotary spit assembly for use in broiling a foodstuff comprising, in combination, an elongated hollow spit shaft for insertion into the foodstuff, means for rotatably supporting said spit shaft, a temperature sensing element inserted in said shaft, and means located on top of the range for indicating the temperature of the element for determining when the foodstuff is cooked.

12. A rotary spit assembly for use in broiling a foodstuff comprising, in combination, an elongated hollow spit shaft for insertion into the foodstuff, means including a hollow output shaft for rotatably supporting said spit shaft, an electrical temperature sensing element inserted in said shaft, and means located remotely from said temperature sensing element for indicating the temperature of the element for determining when the foodstuff is cooked, said indicating means including electrical connectors disposed in said hollow output shaft for connecting with said temperature sensing element.

No references cited.